Patented Dec. 23, 1952

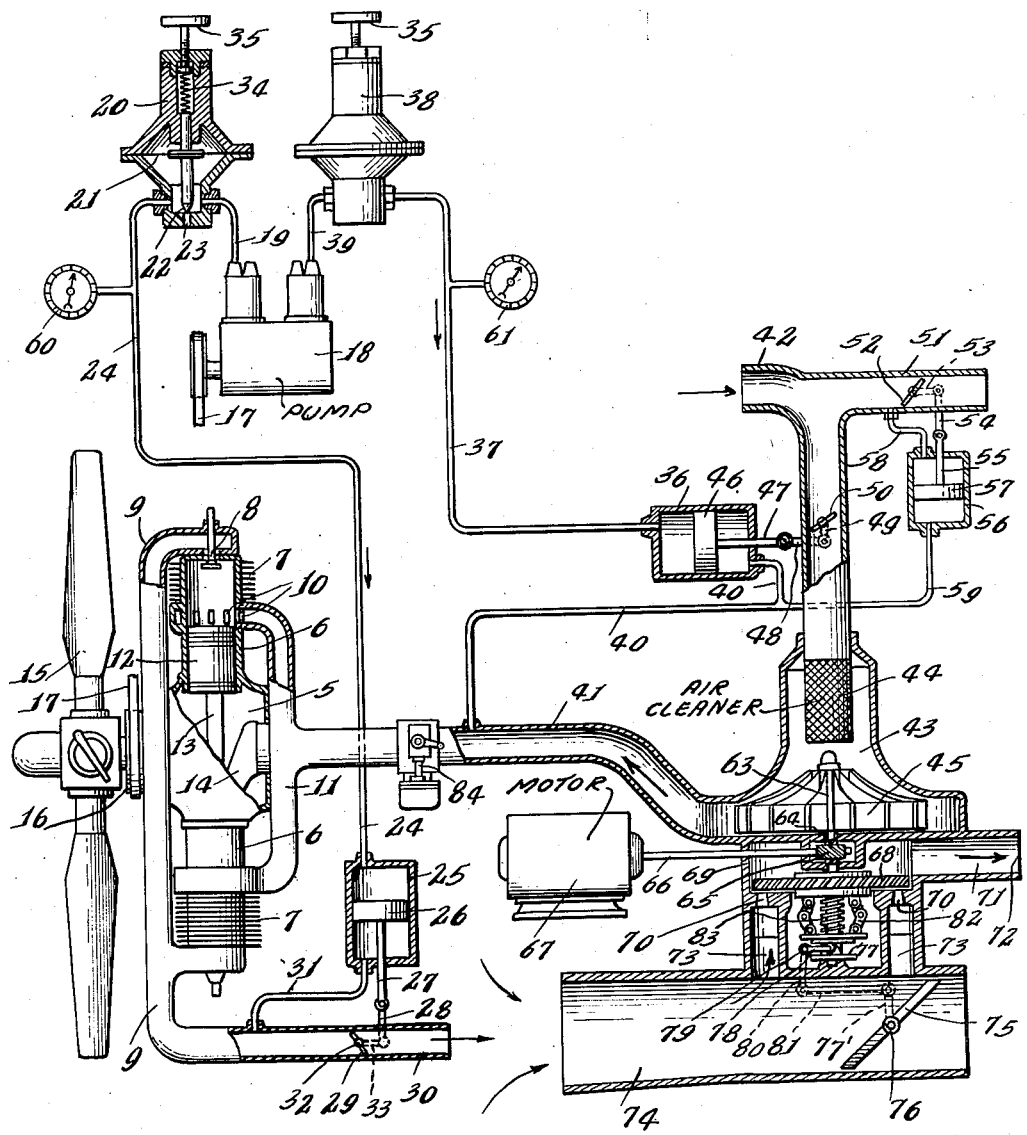

2,622,391

UNITED STATES PATENT OFFICE 2,622,391

INTAKE AND EXHAUST PRESSURE REGULATOR FOR SUPERCHARGED INTERNAL-COMBUSTION ENGINES

Charles A. Lindeman, Jr., Maywood, Ill.

Application April 22, 1946, Serial No. 663,898

5 Claims. (Cl. 60—13)

This invention relates in general to internal combustion engines for variable pressure operation which may be encountered, for example, by high flying aeroplanes, and the invention is more particularly described as an automatic intake and exhaust pressure regulator for such engines.

This invention may be applied in general to various types of internal combustion engines, particularly to two cycle and diesel types of engines, although it may have a more general application to all engines, particularly aircraft engines which are subjected to great variations of atmospheric pressure in flying at different elevations.

An important object of the invention is to provide means for maintaining common intake pressure as applied to the engine regardless of the pressure of the air in which the engine may be operating.

A further object of the invention is to provide for a constant exhaust pressure for the engine regardless of the external atmospheric pressure.

Still a further object of the invention is to maintain a certain rate of intake and exhaust regardless of the atmospheric pressure.

Still a further object of the invention is to provide means for controlling the inlet and exhaust pressures of an engine in starting and in thereafter maintaining a predetermined inlet and exhaust pressure as applied to the engine regardless of the atmospheric pressure.

A further object of the invention is to provide a simple, reliable and economical means for regulating the intake and exhaust pressure of an engine which may be easily varied to suit different conditions and one which is entirely automatic in its action and operation.

Other objects of the invention will appear in the specification and will be apparent from the accompanying drawing which is a view partly in section and partly in elevation illustrating the invention as it applies to an internal combustion engine.

This invention should not be confused with a supercharger which is dependent upon engine speed, whereas the present invention being automatic, is independent of the speed of the engine and automatically compensates for the pressure in the intake and exhaust lines so that a condition similar to the operation of the engine at sea level pressure may be maintained at the highest elevations. A supercharger, for example, takes too much engine power at a wide open throttle at high levels, where conservation of engine power is most important. At a high level, the low back pressure for the exhaust causes the engine to lose too much power and the low pressure of the intake requires too great a supply of air, thereby taking too much power from the engine both in the intake and in the exhaust.

Referring now more particularly to the drawing, the invention is described as applied to an internal combustion engine 5 having cylinders 6 with air cooling fins 7, outer exhaust valves 8 in the cylinder heads, communicating with an exhaust manifold 9 and inlet openings 10 communicating with an inlet manifold 11.

Pistons 12 are connected by cranks 13 with a crank shaft 14 upon which a multi-bladed propeller 15 is mounted. A driving pulley 16 is also mounted upon the crank shaft for operating a belt 17 to drive an air compressor 18.

Extending from the compressor 18 is a pipe 19 leading to an exhaust regulator valve 20 having a spring pressed diaphragm 21 for controlling a valve 22 with relation to a valve opening 23. Extending from the valve 20 is a pipe 24 connected to one end of an exhaust control cylinder 25. A piston 26 is movably mounted for endwise movement in this cylinder and has a piston rod 27 extending through the end of the cylinder opposite its connection with pipe 24 where it is connected by a link 28 for operating a valve 29 in a pipe 30 leading from the exhaust manifold 9. Connecting the exhaust control cylinder 25 from the end opposite the pipe 24 is a pipe 31 which opens into the pipe 30 between the valve 29 and the manifold 9 portion thereof.

The valve 29 is mounted upon an axis 32 extending transversely through the pipe 30, and an arm 33 secured to the valve outside of the pipe is connected to the link 28 so that movement imparted to the piston 26 by the difference in pressure in the control cylinder 25 on opposite sides of the piston by reason of its connection with the exhaust manifold on one side and the air compressor-valve connection on the other side causes the adjustment of the valve 29 to maintain a predetermined pressure for the exhaust manifold such that it will substantially equal the back pressure encountered at sea level, for example, or any other predetermined pressure, as desired. For adjusting and regulating the pressure, the valve 20 has a spring 34 bearing against the diaphragm 21 and a handscrew 35 for adjusting the pressure of the spring, the valve 22 being thus variable to admit or exclude air through the valve opening 23 to maintain the desired pressure in the valve 20 and as applied to the exhaust control cylinder 25.

A similar inlet control cylinder 36 is connected at one end by a pipe 37 through a regulator valve 38 and a pipe 39 to the compressor 18, the opposite end of the cylinder being connected by a pipe 40 with a supply pipe 41 leading to the inlet manifold 11.

The supply pipe has a terminal intake air scoop 42 facing in the direction of flight to receive air under pressure therein, and interposed between the scoop and the intake manifold is an enlarged fan chamber 43. At the end of the scoop and preferably located in the fan chamber is an air cleaner 44 of any suitable construction. A fan 45 is rotatably mounted in the fan chamber receiving air from the scoop and supplying it under pressure to the pipe 41 for feeding it through the pipe 41 to the engine.

Movable in the intake control cylinder 36 is a piston 46 connected by a piston rod 47 and a link 48 to an arm 49 of an intake control valve 50 located in the air scoop 42 between its extremity and the air cleaner 44. The operation of the valve 50 is automatically controlled by the movement of the piston 46 in the control cylinder 36 due to the variation of pressure on opposite sides of the piston caused by the pressure from the compressor 18 on one side and from the intake pipe 41 on the other side. By restricting or opening the valve 50 more or less, the pressure produced by the fan 45 may be the same in the pipe 41 as it would be at sea level, or at any other predetermined pressure which may be varied by adjustment of the valve 38 which is similar in construction and operation to that of the valve 20.

If desired, additional pressure control means for the scoop may be provided comprising an extension 51 at the rear of the air scoop opening having a transverse valve 52 mounted thereon with an outside arm 53 connected thereto and to a link 54. The link is pivoted to a piston rod 55 extending into one end of a control cylinder 56 with a piston 57 on the piston rod and movable in the cylinder. One end of the control cylinder is connected by a pipe 58 with the interior of the extension 51, and the other end of the cylinder is connected with a pipe 59 which joins pipe 40 and therefore receives the same pressure from the supply pipe 41 leading to the inlet manifold.

The control cylinder 56 thus provides additional means for controlling the pressure which is applied to the intake manifold by means of the air scoop 42.

Thus by adjusting the handscrews 35 at the tops of the regulator valves 20 and 38, the pressure of the air intake and the engine exhaust may be varied as desired and automatically maintained in any predetermined position. A pressure gage 60 may be attached to pipe 24, and a pressure gage 61 may be attached to pipe 37 to indicate the pressures and any variations thereof in the inlet and exhaust pressure regulating systems.

For starting and for a maintenance of running conditions, an air compressor or the fan 45 is mounted in the fan chamber 43 to furnish a scavenging air through the pipe 41 to the intake manifold 11. This fan may be mounted upon a shaft 63 extending from the fan chamber having a worm screw 64 engaged by a worm gear 65 mounted upon a shaft 66 and operated by an electric motor 67. By operating the motor, pressure may be built up by the fan in the supply pipe 41 for starting, or at any other time, if desired, without regard to the pressure in the fan chamber caused by the air scoop 42.

Under normal running conditions, the fan 45 may be automatically operated by an air turbine arrangement which comprises a continuation of the shaft 63 upon which an air turbine rotor 68 is mounted in a turbine casing 69 adjacent air inlet nozzles 70 for engaging inclined blades of the turbine rotor and thereby rotating the shaft 63 and the fan 45. At one side of the turbine rotor is a discharge chamber 71 with a trailing outlet 72 for air and exhaust gases which have passed through the turbine and at the other side of the rotor is a ring shaped pressure chamber 73 communicating with the nozzles 70.

A turbine air scoop 74 communicating with the ring shaped pressure chamber 73 opposite the nozzles 70 and the inlet end of the scoop 74 is arranged in line with and to receive exhaust from the pipe 30 leading from the exhaust manifold, the pipe 30 being somewhat smaller than the pipe 74 and arranged in advance thereof so that it operates somewhat as a jet for inducing external air also to flow into the manifold pipe 74. In the operation of an aircraft, the inlet end of the pipe faces forwardly so that it would naturally receive the air flow from the propeller 15 or from the passage of the aircraft rapidly through the air.

In order to build up a pressure in the turbine air scoop pipe 74, a valve 75 is mounted near the rear end of the pipe and so that it closes the pipe beyond the ring chamber 73 with respect to the forward or intake end of the scoop. This valve is mounted upon a transverse shaft 76 which extends outside of the pipe and has an arm 77 connected therewith for moving the valve. A governor means for operating this valve depending upon the speed of the air turbine and its shaft 63 comprises a governor spool or thimble 77 slidable upon the shaft 63, a control arm 78 with an end roller engaging in the thimble or spool, a transverse shaft 79 on which the arm is pivoted, an external arm 80 extending from the shaft 79 and a link 81 connected between the arm 80 and the arm 77' of the valve 75. Weighted governor arms 82 are connected between the rotor mounting and one side of the spool 77, and a coil spring 83 mounted on the shaft 62 between the spool, and the turbine rotor tends to draw the weighted arms inwardly.

With this construction, the governor is so adjusted and regulated that when the turbine rotor and the fan 45 are rotated at a predetermined speed, the valve 75 will be set transversely of the turbine inlet pipe 74 to maintain a sufficient pressure in the turbine pressure chamber 73 to operate the turbine rotor at the desired speed. If the pressure in the turbine inlet pipe 74 is lowered, the governor mechanism operates to close the valve 75 thus tending to build up the pressure in the chamber 73 and to increase the speed of the turbine rotor 68. If the pressure is too high in the pipe 74, the turbine rotor is rotating too rapidly, the governor weight arms are thrown outwardly raising the control arm 78 and through the linkage opening the valve 75 so that more air from the atmosphere and exhaust from the pipe 30 passes through the pipe 74 and causes a reduced pressure in the pressure chamber 73 thereon, correspondingly reducing the speed of the turbine rotor.

The motor 67 may be driven as a generator in flight without disconnecting it from the fan shaft 63 and may be used as a motor to furnish scavenging air pressure at the take-off or under other starting conditions, if desired.

It is intended that this intake and exhaust pressure regulator may be applied to various types of internal combustion engines, either two cycle or four cycle diesel engines which would have fuel injected into the cylinders and to other fuel feeding types of engines in which a carburetor 84 or other feed controlling mechanism is connected to the inlet manifold 11 or to the supply pipe 41 between the manifold 11 and the connection of pipe 40 therewith.

After starting, in which the motor 67 may be operated to build up a sufficient pressure, the operation of the intake and exhaust pressure regulator is entirely automatic depending upon the setting of the regulator valves 20 and 39, and upon the operation of the turbine governor. Pressure is built up in the inlet and in the exhaust regardless of the height of the aeroplane in flight, simulating the condition actually encountered by the aeroplane at sea level or at any other predetermined pressure level. Thus the motor will operate at its maximum efficiency and its maximum power independent of the condition of the external air due to the flight of the aeroplane in a rarified atmosphere.

While a preferred embodiment of the invention has been described, it should be regarded as an example and not as a limitation of the invention as various changes in the construction, combination, and arrangement of the several parts and application of the parts to various types of internal combustion engines may be made without departing from the spirit and scope of the invention.

I claim:

1. The combination with an internal combustion engine having an intake manifold and an exhaust manifold, of a valve in each manifold, a double acting fluid pressure device for operating each valve, means for supplying predetermined pressure to one end of each said device, and a pressure connection from the other end of the said device to the manifold in which the corresponding valve is located.

2. The combination with an internal combustion engine having an intake manifold and an exhaust manifold, of a valve in each manifold, a double acting fluid pressure device for operating each valve, means actuated by the engine for supplying predetermined pressure to one end of each device, a fluid pressure connection from the other end of each device to the manifold in which its valve is located, and the device having a piston movable therein and connected to its said valve.

3. In a high flight aeroplane, an internal combustion engine having an air intake manifold with an inlet scoop facing forwardly and a trailing exhaust manifold, a pressure control valve in each manifold to maintain a predetermined pressure therein, separate fluid pressure means for operating each of said valves, an air pressure relief pipe connected to extend rearwardly from the inlet scoop, a valve in the relief pipe, and a separate fluid pressure device for operating the relief pipe valve connected to the relief pipe and to the fluid pressure means for operating the valve for the inlet manifold and operating reversely thereto to open the relief pipe valve when the inlet manifold valve is closed and to close the relief pipe valve when the inlet manifold valve is opened.

4. In an internal combustion engine for a high flight aeroplane, an air inlet manifold with a forwardly facing scoop and a rearward relief pipe extending from the scoop, a valve in the manifold and a valve in the relief pipe, differential means for maintaining predetermined pressure in the intake manifold comprising a fluid pressure device for operating the manifold valve and a fluid pressure device for operating the relief pipe valve, these two devices having a common reversing pressure connection with each other such that when one opens its valve the other closes its valve.

5. In an internal combustion engine for a high flight aeroplane, an air inlet manifold with a forwardly facing scoop and a rearward relief pipe extending from the scoop, a valve in the manifold and a valve in the relief pipe, differential means for maintaining predetermined pressure in the intake manifold comprising a fluid pressure device for operating the manifold valve and a fluid pressure device for operating the relief pipe valve, these two devices having a common reversing pressure connection with each other such that when one opens its valve the other closes its valve, and fan pressure means connected in the inlet manifold between said manifold valve and the engine for adding pressure to the air in the manifold as supplied to the engine.

CHARLES A. LINDEMAN, Jr.

REFERENCES CITED

The following references are of record in the file of this patent:

UNITED STATES PATENTS

| Number | Name | Date |
|---|---|---|
| 2,164,167 | Schneider | June 27, 1939 |
| 2,283,006 | Kittler et al. | May 12, 1942 |
| 2,347,586 | Whitworth | Apr. 25, 1944 |
| 2,373,139 | Morris | Apr. 10, 1945 |
| 2,376,143 | Edwards | May 15, 1945 |
| 2,376,199 | Shoults | May 15, 1945 |
| 2,423,417 | Stokes | July 1, 1947 |
| 2,467,513 | Welsh | Apr. 19, 1949 |
| 2,495,564 | Alexanderson | Jan. 24, 1950 |
| 2,559,623 | Holmes | July 10, 1951 |

FOREIGN PATENTS

| Number | Country | Date |
|---|---|---|
| 305,111 | Germany | June 18, 1920 |
| 537,483 | Great Britain | June 24, 1941 |